3,739,035
BIS(2,6-DIPHENYLPHENOLS)
Jimmy L. Webb, Jonesville, N.Y., and Walter L. Hall, Mount Vernon, Ind., assignors to General Electric Company
No Drawing. Filed May 26, 1971, Ser. No. 147,165
Int. Cl. C07c 39/16
U.S. Cl. 260—619 A       6 Claims

ABSTRACT OF THE DISCLOSURE

Bis(2,6-diphenylphenols) prepared from 2,6-diphenylphenol and certain aldehydes and ketones are new chemical compounds. They are useful in making highly crystalline, thermally stable polyesters, including polycarbonates as homopolymers or for imparting these properties to copolymers in which they are incorporated.

---

This invention relates to novel bis(2,6-diphenylphenols). The general term—bisphenols—designates phenols which have two phenol moieties joined by a divalent group, most commonly an alkylidene group, which differentiates them from biphenols wherein the two phenol moieties are directly connected to each other. More specifically, this invention relates to bis(2,6-diphenylphenols) wherein the two 2,6-diphenylphenol moieties are joined together through their para or 4-positions by a

group where R is selected from the group consisting of hydrogen, methyl and trifluoromethyl and R' is selected from the group consisting of hydrogen, trifluoromethyl and, in addition, carboxyl when R is hydrogen.

Generally, bisphenols are made by the reaction of an aldehyde or ketone with a phenol using an acid catalyst. Since aldehydes are not specific and react with either unsubstituted ortho and para positions of the phenol, low yields of the desired bisphenols are obtained wherein the alkylidene moiety of the aldehyde joins the two phenol moieties through their para positions, unless a 2,6-dialkylphenol is used so that only the para position of the phenol can be involved in the reaction to form the bisphenol. Ketones preferentially attack the unsubstituted para position of phenols so that good yields of the 4,4'-bisphenol are obtained even with phenol itself, providing an excess of the phenol is used and preferably a sulfur compound is present.

As long as the alkyl substituents in one or both of the ortho positions of the phenol are straight chain or at least have a primary α-group, i.e., a —CH$_2$— group joining the alkyl group to the phenol nucleus, no difficulty is encountered in making bisphenols from either aldehydes or ketones. Generally, no trouble is experienced if only one substituent in the two ortho positions has a secondary or tertiary α-carbon atom. However, the yield of the bisphenols is greatly decreased when both ortho substituents have a secondary α-carbon atom and no bisphenol is obtained if both ortho positions have substituents with a tertiary α-carbon atom.

Surprisingly enough, a phenyl substituent in only one ortho position of the phenol, e.g., 2-phenylphenol, greatly decreases the yield of the corresponding bisphenol. No bisphenols from 2,6-diphenylphenol have been reported in the literature. The only mention has been the unsuccessful attempt to react it with acetone. For a more detailed discussion of the effect of substituents in the ortho positions of phenols on their reactivity in the bisphenol reaction, reference is made to the series of articles by J. Kahovec and J. Popisil appearing in "Coll. Czechosov. Chem. Commun." especially the two papers appearing in 33, 1709 (1968) and 34, 2843 (1969) which are hereby incorporated by reference.

Until Hay discovered a method of making poly(2,6-diphenyl-1,4-phenylene oxide) from 2,6-diphenylphenol, as disclosed and claimed in U.S. Pat. 3,432,466, there has been little use for this fairly recently synthesized material. In our studies of the chemistry of 2,6-diphenylphenol, we confirmed the teaching of Kahovec and Popisil mentioned above that acetone will not react with 2,6-diphenylphenol to form the bisphenol, 4,4'-isopropylidenebis (2,6-phenylphenol).

However, as disclosed and claimed in our copending application Ser. No. 147,163, filed concurrently herewith and assigned to the same assignee as the present invention, we have discovered that acetone as well as certain other ketones and aldehydes will react with 2,6-diphenylphenol, as well as other phenols having an o-phenyl substituent in certain liquid media whose acid strength, as measured on the Hammett H$_0$ scale, is at least as strong as trifluoroacetic acid, to yield the corresponding dibenzopyrans. We further discovered that formaldehyde, preferably in the form of its polymeric modifications, for example, trioxane, paraform, etc., acetaldehyde, preferably in its polymeric modification, for example, paraldehyde, trifluoroacetaldehyde, preferably as its hydrate, fluoral hydrate, 1,1,1 - trifluoroacetone, hexafluoroacetone and glyoxylic acid, under acid conditions which vary depending on the particular carbonyl compound, unexpectedly react with 2,6-diphenylphenol to form very good yields of the corresponding bisphenols. This was indeed surprising in view of the teaching of Kahovec et al. and our own findings mentioned above. These bisphenols are new chemical compounds and are the subject of the present invention.

These new bisphenols are particularly useful since they can be used in making polyesters, including polycarbonates, which have excellent thermal properties and excellent solvent resistance. Copolyesters, including copolycarbonates and copolyester-polycarbonates, with other bisphenols can be made whereby the good thermal and solvent resistance is maintained. Because each hydroxyl group is somewhat sterically hindered due to the presence of a phenyl group on each side of it on the benzene ring, the polyesters of aliphatic dicarboxylic acids are generally prepared from the acid chloride using zinc metal as an esterification catalyst. In making the polycarbonates, it is preferable to first react phosgene with some of the bisphenol to make the bischloroformate which is then further reacted with an additional amount of the bisphenol or another bisphenol or biphenol if a copolycarbonate is to be made.

The bisphenols of this invention have the formula,

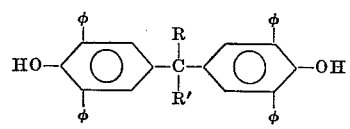

where $\phi$ is phenyl, R is selected from the group consisting of hydrogen, methyl and trifluoromethyl and R' is selected from the group consisting of hydrogen, trifluoromethyl and, in addition, carboxyl when R is hydrogen. These compositions are made by reacting 2,6-diphenylphenol with the appropriate carbonyl compound under acidic conditions. The particular carbonyl compounds have been mentioned previously. Acetaldehyde and formaldehyde, in their polymeric form, can be reacted using formic acid as the solvent. Glyoxylic acid and the fluoroacetones generally require stronger acid conditions than provided by formic acid. These conditions can be obtained by using trifluoroacetic acid or methanesulfonic acid as the solvent medium. These acids can also be used in place of formic acid for formaldehyde, but not acetaldehyde which gives the corresponding dibenzopyrans. The particular reaction conditions found to be generally satisfactory for making these compounds are disclosed in the following examples.

In order that those skilled in the art may better understand our invention, the following examples are given by way of illustration and not by way of limitation. In all of the examples, parts are by weight and temperatures are in degrees centigrade unless otherwise specifically noted. Where elemental analyses are given for the named compound, the theoretical values calculated for this compound are given in parentheses after the analytically determined values.

EXAMPLE 1

A solution of 20 g. of 2,6-diphenylphenol in 200 ml. of 97% aqueous formic acid was heated to reflux and 1.79 g. of paraldehyde was added. The initially clear solution turned orange immediately on the addition of the paraldehyde. After 30 minutes the reaction mixture had darkened and the product had formed a second oil phase. After 27 hours of reaction, the reaction mixture was poured upon ice and the product extracted with chloroform. After washing the chloroform solution with water until free of acid, it was dried over anhydrous sodium sulfate and concentrated on a rotary evaporator. The oily residue weighing 20.6 g. was analyzed by thin layer and gas-liquid chromatography and found to consist of approximately 7 g. of the starting 2,6-diphenylphenol and 13 g. of the desired bisphenol. Trace amounts of a pyran were also detected.

A portion of the product mixture was chromatographically separated on an alumina column using chloroform as eluent. The product was found to still contain a trace amount of the starting phenol which was removed by recrystallization from methanol to yield pure ethylidene-bis(m-terphen-5′-yl-2′-ol), which can also be called 4,4′-ethylidenebis(2,6-diphenylphenol), having a melting point of 160–162°. The structure was confirmed by infrared and NMR spectroscopy. Elemental analysis showed: C, 88.0 (88.2); H, 6.0 (5.8). Molecular weight 522 (519). Similar results were obtained when an 82% aqueous solution of trifluoroacetic acid was substituted for the formic acid.

This bisphenol was converted to its diacetate having a melting point of 233.5–234.5 by reaction with acetic anhydride in the presence of pyridine. This structure was again confirmed by infrared and NMR spectroscopy and determination of its molecular weight 605 (603).

EXAMPLE 2

A solution of 30 g. of trioxane in 97% aqueous formic acid was added to a refluxing solution of 520 g. of 2,6-diphenylphenol in two liters of 97% aqueous formic acid. During 2 hours reaction at reflux, the product precipitated. It was isolated by filtration of the hot reaction mixture and washed well with water. After drying, the product was dissolved in hot chloroform and the solution added to hot methanol. After cooling, the precipitate was removed by filtration and dried in a vacuum oven. A yield of 405.3 g. of methylenebis(m-terphen-5′-yl-2′-ol), which can also be called 4,4′-methylenebis(2,6-diphenylphenol) was obtained as a white crystalline solid having a melting point of 201.5–202.5 whose structure was confirmed by infrared and NMR spectroscopy. Its elemental chemical analysis was: C, 87.7 (88.1); H, 5.6 (5.6). Molecular weight 498 (505).

This compound was also converted to its diacetate, melting point 216–217.5°, by reaction with acetic anhydride in the presence of pyridine and identified by infrared and NMR spectroscopy.

Similar results were obtained when 88% aqueous formic acid or trifluoroacetic acid was substituted for the 97% aqueous formic acid in the above preparation. Likewise, similar results were obtained when paraformaldehyde was substituted for the trioxane using trifluoroacetic acid in place of the formic acid. Somewhat lower yields were obtained when aqueous formaldehyde was used in place of the trioxane using trifluoroacetic acid to provide the acid medium. Although trithiane was used in place of its oxygen isologue, it did not produce as good yields of the bisphenol.

EXAMPLE 3

Using a flask fitted with a solid carbon dioxideacetone cooled condenser, 2.6 g. of gaseous hexafluoroacetone was bubbled into a mixture of 5 g. of 2,6-diphenylphenol in 200 g. of methanesulfonic acid. This reaction mixture was slowly heated to 113° over a 2.5 hour period during which time the solution became pink and a solid precipitated from solution. The reaction mixture was maintained at 100° for an additional 18.5 hours after which the precipitate, which had formed, was isolated by filtration of the hot mixture. After washing several times with water and drying, 2.15 g. of [trifluoro-1-(trifluoromethyl)ethylidene]-bis(m-terphen-5′-yl-2′-ol), which can also be named 4,4′-(hexafluoroisopropylidene)-bis(2,6-diphenylphenol) was isolated as a white crystalline solid having a melting point of 271–272.5° whose structure was confirmed by infrared and NMR spectroscopy. Elemental analysis showed: C, 73.0 (73.1); H, 3.8 (4.1). Molecular weight 617 (661). Its diacetate had a melting point of 196–198° and its structure was confirmed by NMR spectroscopy.

EXAMPLE 4

A solution of 5 g. of 2,6-diphenylphenol in 300 g. of methanesulfonic acid was heated to 90° and 2.5 g. of 1,1,1-trifluoroacetone added. After 45 minutes, a precipitate had formed and was removed by filtration and washed several times with water and dried in vacuum. The crude 1-(trifluoromethyl)ethylidene-bis(m-terphen-5′-yl-2′-ol), which can also be named 4,4′-[1-(trifluoromethyl)ethylidene]bis(2,6-diphenylphenol), and weighed 4 g., and was recrystallized from acetic acid to produce a white crystalline solid having a melting point of 227.5–228.5°. Its structure was confirmed by infrared and NMR spectroscopy. Its elemental analysis was: C, 79.9 (79.9); H, 5.0 (5.0). Molecular weight 563 (586). Its diacetate was a white crystalline solid having a melting point of 170–171°, whose structure was confirmed by NMR spectroscopy.

EXAMPLE 5

A solution of 12.3 g. of 2,6-diphenylphenol in 100 ml. of trifluoroacetic acid was heated to reflux and 2.9 g. of trifluoroacetaldehyde hydrate was added over a 2 minute period. The solid product that formed during 20 hours at reflux, was isolated by filtration of the hot reaction mixture and washed several times with water and methanol. The crude (trifluoromethyl)methylenebis(m - terphen-5′-yl-2′-ol), which can also be named 4,4′-(2,2,2-trifluoroethylidene)bis(2,6-diphenylphenol), weighed 6.1 g. After recrystallization from aqueous methanol, it was obtained as a white crystalline solid having a melting point of 179–180° whose structure was confirmed by infrared and NMR spectroscopy. Elemental analysis showed: C, 80.1 (79.7); H, 4.9 (4.8). Molecular weight 588 (572). Its diacetate was a white crystalline solid having a melting point of 163.5°. The structure was confirmed by infrared and NMR spectroscopy.

EXAMPLE 6

While maintaining a solution of 37 g. of 2,6-diphenylphenol in 200 g. of trifluoroacetic acid at reflux, 5.55 g. of crystalline glyoxylic acid monohydrate was added in small portions over a period of 30 minutes. Refluxing was continued for 30 minutes and then the major portion of the trifluoroacetic acid was distilled from the reaction flask over a period of 30 minutes. The residue was filtered and washed with water and methanol giving a yield of 28.4 g. of bis(m-terphen-5'-yl-2'-ol)acetic acid, an alternative name for which is bis(3,5-diphenyl-4-hydroxyphenyl)acetic acid, as a white crystalline material having a melting point of 272–275°. Recrystallization from methanol followed by recrystallization from a mixture of two volumes of diethyl ether to one volume of heptane gave a pure material melting at 275–276° whose structure was confirmed by NMR and infrared spectroscopy. Elemental analysis showed: C, 83.1 (83.2); H, 5.5 (5.1). Its molecular weight was determined by titration with tetrabutylammonium hydroxide in pyridine and found to be 544 (549).

As discussed previously, the bisphenols of this invention can be used to make polyesters and polycarbonates either as homopolymers or as copolymers with other bisphenols. The polyesters from aliphatic dicarboxylic acids, for example, succinic acid and glutaric acid are high molecular weight polymers which are readily soluble and can be cast to produce flexible clear films. The homopolymer with adipic acid are crystalline and produce opaque films. However, the copolymers in which 4,4'-isopropylidenebisphenol is also used can be made which are noncrystalline. The homopolycarbonates are highly crystalline and have excellent solvent and hydrolytic stability. The copolycarbonates with 4,4'-isopropylidenebisphenol can be made which are noncrystalline but have improved solvent and thermal properties over the homopolymer from 4,4'-isopropylidenebisphenol. By first forming the bischloroformate of our bisphenols which are then reacted with bisphenols of the prior art, block polycarbonates are obtained in which the bisphenol moiety from the present invention alternate along the polymer molecule with the bisphenol moieties of the prior art.

The above examples have shown some of the variations which are possible with our invention. Other obvious variations will be apparent to those skilled in the art in light of the above teachings. All such variations are within the full intended scope of the invention as defined by the appended claims.

What we claim as new and desire to secure by Letters Patent of the United States is:

1. Bisphenols having the formula,

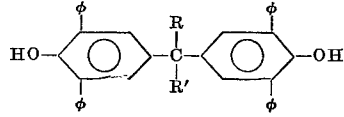

where $\phi$ is phenyl, R is selected from the group consisting of hydrogen, methyl and trifluoromethyl and R' is selected from the group consisting of hydrogen and trifluoromethyl.

2. The compound of claim 1 wherein R and R' are each hydrogen.

3. The compound of claim 1 wherein R is methyl and R' is hydrogen.

4. The compound of claim 1 wherein R and R' are each trifluoromethyl.

5. The compound of claim 1 wherein R is methyl and R' is trifluoromethyl.

6. The compound of claim 1 wherein R is hydrogen and R' is trifluoromethyl.

References Cited
UNITED STATES PATENTS

| | | | |
|---|---|---|---|
| 2,535,015 | 12/1950 | Johnson et al. | 260—619 A |
| 2,734,088 | 2/1956 | Knowles et al. | 260—619 A |
| 2,955,038 | 10/1960 | Smith | 260—619 A |

BERNARD HELFIN, Primary Examiner

U.S. Cl. X.R.

260—520, 620, 479 R, 479 S, 47 XA, 47 C